United States Patent Office 3,538,192
Patented Nov. 3, 1970

3,538,192
PREPARATION OF RUBBER MODIFIED PLASTICS
William A. Bishop, Sr., Baton Rouge, La., assignor to Copolymer Rubber & Chemical Corporation, a corporation of Louisiana
No Drawing. Filed Apr. 10, 1967, Ser. No. 629,355
Int. Cl. C08f 29/12
U.S. Cl. 260—878                          32 Claims

ABSTRACT OF THE DISCLOSURE

Plastics having improved impact resistance are prepared by interpolymerizing a rubbery interpolymer of a mixture of monoolefins and a polyene, such as a terpolymer of ethylene, propylene and 5-ethylidene-2-norbornene, and monomeric material including an alkenyl aromatic monomer such as styrene, or a mixture thereof with an acrylic monomer such as acrylonitrile, in the presence of a free radical initiator and a preformed polymer as a dispersing aid for the rubbery interpolymer. Improved dispersions of the normally insoluble rubbery interpolymer in a mixture of the alkenyl aromatic monomer and the acrylic monomer are also prepared.

---

This invention broadly relates to the preparation of plastics having improved impact resistance. In another of its variants, the invention further relates to a novel method of preparing improved dispersions of a normally insoluble rubbery interpolymer in a mixture of resin-forming monomers.

A wide variety of processes have been proposed heretofore for the preparation of high impact or gum plastic compositions, which are referred to herein as being rubber modified plastics. The most commonly used commercial process involves a large number of reactions in separate vessels including preparing a hard and durable styrene-acrylonitrile resin which is brittle and has low impact resistance, preparing a highly unsaturated elastomer such as polybutadiene which is capable of absorbing shock, thereafter improving the compatability of the elastomer with the styrene-acrylonitrile resin by grafting monomeric styrene and acrylonitrile thereon, and then blending the styrene-acrylonitrile resin with the grafted elastomer in proportions to arrive at a product which has useful physical properties. Often the above process failed to produce a rubber modified plastic which has optimum properties in all respects, including impact resistance, tensile strength and hardness, and this is a further important deficiency of the prior art.

A somewhat simplified two-stage process for preparing rubber modified plastics has been developed recently. This process includes dissolving a highly unsaturated diene rubber such as polybutadiene in a mixture of styrene and acrylonitrile monomers in the proportions that are desired in the final product, and then prepolymerizing the mixture to produce a prepolymer cement containing some monomeric material. The prepolymer cement is then suspended in water containing a suspending aid, and the polymerization is continued until the monomers have reacted to substantially 100% conversion. The resulting rubber modified plastic product is recovered in the form of beads, which may be dried and further processed in accordance with the prior art.

While the process described immediately above is useful in preparing rubber modified plastics from the diene rubbers, which have high unsaturation levels, it does not produce satisfactory products when rubbery interpolymers prepared from a mixture of monoolefins and a polyene are substituted for the diene rubber. It has been discovered that this specific class of rubbery polymers, which may be referred to herein as EPDM elastomers, is very insoluble in the monomeric mixture of styrene and acrylonitrile, and that the rubber tends to separate out in the form of a tight gel which cannot be uniformly dispersed throughout the monomeric mixture even with vigorous agitation. It has been further discovered that, due to the insolubility of EPDM elastomers, the rubber particle size that exists in the final rubber modified plastic products is much too large for acceptable physical properties and thus inferior high impact plastics are produced. While EPDM elastomers are somewhat soluble in styrene monomer, nevertheless the particle size of the dispersed rubbery polymer phase in the final product is still too large for optimum physical properties when preparing high impact polystyrene therefrom.

The oxidation resistance and weathering properties of rubber modified plastics prepared by the above mentioned two-stage process may be improved markedly by substituting EPDM elastomers for the highly unsaturated diene rubbers which are presently used. The resulting high impact plastics often have excellent properties with respect to oxidation resistance and weathering, but the hardness, impact resistance and/or tensile strength are too low. Thus, the high impact plastic products prepared heretofore by the two-stage process from EPDM elastomers have not been entirely acceptable.

It is an object of the present invention to provide a novel method of preparing a dispersion of a normally insoluble rubbery polymer in a liquid monomeric mixture containing an alkenyl aromatic monomer and an acrylic monomer.

It is a further object to provide a novel process for preparing plastics having improved impact resistance from a rubbery interpolymer of a mixture of monoolefins and a polyene wherein the particle size of the dispersed rubbery polymer is controlled within desirable limits.

It is still a further object to provide a novel process for preparing high impact polystyrene from EPDM elastomers as the rubbery polymer phase.

It is still a further object to provide a novel process for preparing high impact styrene-acrylonitrile plastics from EPDM elastomers.

Still other objects and advantages of the invention will be apparent to those skilled in the art upon reference to the following detailed description and the examples.

In accordance with one important variant of the invention, rubber modified plastics are prepared by dissolving an EPDM elastomer in an alkenyl aromatic monomer, mixing the solution of the EPDM elastomer with a dispersing agent of the invention, and interpolymerizing the resulting mixture in the presence of a free radical initiator until 90–100% by weight of the alkenyl aromatic monomer has reacted to produce the rubber modified plastic. In another preferred variant, an acrylic monomer is mixed with the above solution of EPDM elastomer in the presence of the dispersing agent, and the resulting mixture of the alkenyl aromatic monomer, acrylic monomer, and EPDM elastomer is interpolymerized in the presence of the dispersing agent and the free radical initiator. This latter variant of the invention is especially useful in preparing high impact styrene-acrylonitrile copolymer plastics, whereas the first variant is especially useful in preparing high impact polystyrene plastics. There are certain other variants of the invention which produces preferred results, as will be discussed more fully hereinafter.

The dispersing agents of the invention are preformed polymerization products resulting from the homo- or interpolymerization of one or more alkenyl aromatic monomers and mixtures thereof with one or more acrylic monomers, and in the presence or absence of the EPDM elastomers. Species of the dispersing agent include preformed:

(a) the homopolymers of the alkenyl aromatic monomers, (b) the graft interpolymers of the EPDM elastomers and the alkenyl aromatic monomers, (c) the graft interpolymers of the EPDM elastomers and the acrylic monomers, (d) the interpolymers of the alkenyl aromatic monomers and the acrylic monomers, (e) the graft interpolymers of the EPDM elastomers, the alkenyl aromatic monomers and the acrylic monomers, and (f) mixtures of two or more of the foregoing. Prior art processes may be used for preparing the above dispersing agents. For example, the monomer, mixture of monomers, or mixtures of monomer or monomers and EPDM elastomers, preferably in the proportions desired in the dispersing agent, may be polymerized in the presence of a free radical initiator such as benzoyl peroxide at a temperature of about 60–100° C. and preferably 70° C. The resulting polymer may be used in the process of the invention as a preformed dispersing agent. If desired, the dispersing agent may be one or more products produced in a previous polymerization in accordance with the invention, and then added to a subsequent polymerization.

The above mentioned homopolymers of the alkenyl aromatic monomers, and the interpolymers of the alkenyl aromatic monomers and acrylic monomers, preferably are present in the reaction mixture to be polymerized in an amount of about 1–20, and for better results 2–10 parts by weight for each 100 parts by weight of the unreacted monomer or monomers. The graft interpolymers of the EPDM elastomer and the alkenyl aromatic monomer and/or acrylic monomer may be present in an amount of about .03–20 parts by weight and preferably .1–10 parts by weight, for each 100 parts by weight of the unreacted monomer or monomers to be polymerized. The graft interpolymers in admixture with a homopolymer and/or interpolymer of the graft monomer or monomers formed during the graft interpolymerization are usually the preferred species of dispersing agents.

It is also preferred that the dispersing agent be prepared from substantially the same elastomer and/or monomeric composition that is to be polymerized in accordance with the present invention. For instance, when preparing a rubber modified plastic from an alkenyl aromatic monomer, such as high impact polystyrene, the dispersing agent is preferably polystyrene and/or a graft interpolymer of the EPDM elastomer and styrene in the quantities stated above. When preparing rubber modified plastics from a mixture of the alkenyl aromatic monomer and the acrylic monomer, such as high impact styrene-acrylonitrile copolymer plastics, the preferred dispersing agents are styrene-acrylonitrile copolymer and/or graft interpolymers of the EPDM elastomer, the styrene monomer and acrylonitrile in the quantities mentioned above.

When preparing the graft interpolymer dispersing agents, the ratio by weight of the graft monomer or monomers to EPDM elastomer may be, for example, between 1:4 and 4:1, and preferably between 1:2 and 2:1. Best results are usually obtained when each 100 parts of the EPDM elastomer is grafted with about 30–120 parts by weight of the monomeric material.

While it is not always essential, it is usually preferred that the polymerization be conducted in two steps or stages. In the first stage, a prepolymer cement is formed in which approximately 10–40% by weight and preferably 15–30% by weight of the monomers initially present have reacted to form resinous polymer and graft interpolymer. The resulting prepolymer cement is viscous, and may be readily suspended in water containing a surface active agent.

When preparing the suspension, a surface active agent which may be a water soluble nonionic colloid such as hydroxyethyl cellulose is added to the water. Other surface active agents may be used, if desired, either alone or in combination with the hydroxyethyl cellulose. Examples of surface active agents include synthetic detergents such as sodium, potassium or ammonium alkyl aryl sulfonates, and especially the alkyl benzene sulfonates and the polymerized alkali metal salts of alkyl nephthalene sulfonic acid. Other surface active agents include carboxymethylcellulose, polyvinyl alcohol, methylcellulose, sulphonated polystyrenes or polyglycol ethers. The suspending agent need be added only in an amount sufficient to aid in suspending the prepolymer cement, such as about 0.1–5% by weight. Hydroxyethyl cellulose or mixtures thereof with the synthetic detergents is usually preferred, and it may be added in an amount of about 0.1–1% by weight, and preferably about 0.2–0.5% by weight of the prepolymer cement.

Better results are usually obtained when an oxygen scavenger is added to the water for the purpose of removing traces of oxygen. The oxygen scavengers normally used in emulsion polymerization are satisfactory, including sodium or potassium hydrosulfite. The oxygen scavenger is added in the amount usually employed in emulsion polymerization such as 0.001–0.1% by weight of the cement and preferably about 0.01% by weight.

The water containing the surface active agent should be vigorously agitated and the prepolymer cement added slowly thereto for best results. Agitation with a marine-type impeller is satisfactory, and the impeller may be operated at speeds of at least 100 r.p.m., and preferably at about 200–1000 r.p.m. The propolymer cement is suspended in the form of small globules having a particle size of about 0.5–2 mm. The polymerization is continued at the normal polymerization temperature with sufficient agitation to assure that the particles remain suspended until the desired conversion of monomers to polymer is reached.

The final reaction mixture is a slurry of polymer heads having a diameter of, for example, about 0.5–2 millimeters. The polymer may be dewatered and dried in accordance with prior art practice. Drying in a prior art oven for several hours at 50–100° C., or fluidized bed drying at this temperature for a shorter period of time is satisfactory. The dried beads may be pelletized or formed into other desired shapes suitable for marketing.

It is important that the reaction mixture be vigorously agitated during the initial stages of the reaction when the prepolymer cement is being prepared. Agitation with a marine-type impeller is satisfactory, and especially when operating at high speeds such as 200–2000 r.p.m. This vigorous agitation helps to reduce the particle size of the rubber and maintain a uniform dispersion in the presence of the dispersing agent.

If desired, the prepolymer cement may be bulk polymerized rather than polymerized by the above suspension technique. In such instances, the prepolymer cement is passed into a reaction vessel which may be a mold, and the polymerization is continued under the usual conditions until the reaction is complete.

The reaction product is a mixture of resinous polymers and grafted EPDM elastomer. It may contain one or more resinous homopolymers of the alkenyl aromatic monomer and/or acrylic monomer, resinous interpolymers thereof when both are present, and EPDM elastomer grafted with the alkenyl aromatic monomer and/or acrylic monomer.

It is therefore apparent that either the prepolymer cement and/or the final high impact plastic product may be used as the dispersing aid. In instances where the prepolymer cement is used, when desirable it may be cooled down to a temperature at which the free radical catalyst is inactive before adding to the solution of the elastomer. The prepolymer cement contains about 10–40%, and preferably about 15–30% by weight of the dispersing aid on a dry solids basis.

Several different procedures may be followed when preparing the prepolymer cement. Batch operation involves the batchwise addition of all ingredients of the recipe to the empty reaction vessel, and then proceeding with the reaction until the prepolymer cement has been prepared. All of the cement is removed from the reactor, and the steps are repeated.

In one variant of the blend back method, all of the ingredients of the recipe are charged batchwise to the reactor in the initial run and polymerized until the desired percent conversion is reached. A portion of the prepolymer cement is withdrawn from the reactor, such as 10–80% by weight and preferably about 20–50% by weight, and an additional quantity of the ingredients of the recipe is added to the remaining prepolymer cement and a second batch is prepared. The prepolymer cement remaining in the reaction vessel serves as the dispersing aid, and thus the dispersing aid has substantially the same composition as the polymerization mixture. The prepolymer cement that is withdrawn contains about 90–60% by weight, and preferably 85–70% by weight of the initial monomers and it is further polymerized to 90–100% by weight conversion, by the bulk or suspension method. The above steps after the initial run may be repeated indefinitely.

The process of the invention also may be conducted on a continuous basis by continuously feeding a solution of the elastomer in alkenyl aromatic monomer into a reaction vessel, together with the initiator or the initiator may be fed separately, and reacting it therein with agitation. The rate of feed of monomeric material and initiator and the rate of continuous withdrawal of prepolymer cement are controlled so as to provide a desired residence time, such as about 1–4 hours and preferably about 2–3 hours. The prepolymer cement may have a solids content equal to about 10–40% by weight of the monomers initially charged; however, smaller or larger amounts of the monomers may be converted to polymer solids such as 5–10% or 40–60%. The volume of prepolymer cement which is maintained in the reaction vessel is sufficient to assure the presence of the quantity of dispersing aid mentioned hereinbefore. The continuous method is especially useful for the preparation of high impact polystyrene, or high impact styrene-acrylonitrile copolymer. In instances where a high impact styrene-acrylonitrile copolymer is prepared, then the acrylonitrile may be fed continuously into the reaction vessel as a separate stream so as to assure that it is admixed with the entering styrene solution of elastomer in the presence of the prepolymer cement. The prepolymer cement is continuously withdrawn from the reaction vessel and it may be further polymerized to the final product by the bulk or suspension method.

The preparation of the prepolymer cement, as well as the further polymerization thereof by the bulk or suspension method, may be conducted under pressure when this is desirable. For instance, the reaction vessels in each instance may be operated under pressures of 5–50 p.s.i.g. or higher. The preferred pressurizing gases are inert and include nitrogen, helium, argon, and the like.

The particle size of the dispersed rubber phase in the final products is extremely small, and this results in higher physical properties. In order to obtain the fine rubber particle size, it is essential that the initial polymerization be conducted in the presence of the preformed dispersing aid of the invention as otherwise acceptable results are not obtained. In other words, the preformed dispersing aid must be present when the particle size of the rubber is being established in order for it to be effective.

In accordance with another variant of the invention, a method is provided for preparing a dispersion of the EPDM elastomer in a liquid mixture containing an alkenyl aromatic monomer and an acrylic monomer. The elastomer is insoluble in mixtures which contain 5% or more by weight of the acrylic monomer, and thus the elastomer is insoluble in the commercially important ratios by weight of styrene to acrylonitrile, e.g., 1:4 to 4:1 and preferably about 3:1. The fine, uniform dispersion may be prepared by dissolving the elastomer in the alkenyl aromatic monomer, and then mixing the solution with the acrylic monomer in the presence of the preformed dispersing agent. The dispersing agent is present in the ratio of dispersing agent to monomeric material previously mentioned. The resulting mixture may contain at least 1 part by weight of the elastomer, at least .03 part by weight of the preformed dispersing agent, and at least 5 parts by weight of the acrylic monomer. The acrylic monomer should be slowly added to the elastomer solution and preferably under conditions of vigorous agitation for best results.

The alkenyl aromatic monomers which may be used in practicing the present invention include alkenyl aromatic hydrocarbons containing 8–20 carbon atoms and their halogenated derivatives. Specific examples included styrene, chlorostyrene, alpha-alkyl styrenes wherein the alkyl group contains 1–8 carbon atoms such as alpha-methyl styrene, alpha-chloro styrene, vinyl naphthalene, alkyl substituted vinyl naphthalenes wherein the alkyl group or groups contain 1–8 carbon atoms, and halogen substituted vinyl naphthalenes. Styrene is preferred in most instances, and the invention is especially useful for the preparation of high impact polystyrene.

The acrylic monomers which may be used in practicing the invention have the general formula

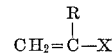

wherein R is selected from the group consisting of hydrogen and alkyl groups having 1–9 carbon atoms, and X is selected from the group consisting of

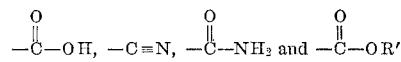

wherein R' is an alkyl group containing 1–9 carbon atoms. Examples of specific acrylic monomers which are especially useful include acrylonitrile, acrylamide, methyl or ethyl acrylonitrile, and acrylic, methacrylic, and ethacrylic acid and the methyl, ethyl, propyl and isopropyl esters thereof. Acrylonitrile is usually the preferred acrylic monomer.

When a mixture of one or more of the alkenyl aromatic monomers and one or more of the acrylic monomers is employed, preferably the ratio by weight of alkenyl aromatic monomer to acrylic monomer is at least 1.5:1, and between 2:1 and 4:1 for better results. The optimum properties are obtained in many instances with styrene and acrylonitrile at ratios by weight of 72:28 and 78:22, or about 3:1. The preferred monomers for use in preparing the monomer mixtures are usually styrene and acrylonitrile.

The EPDM elastomers which may be used in practicing the present invention include those used in prior art processes for preparing high impact polystyrene or styrene-acrylonitrile plastics. Other examples of EPDM elastomers include the rubbery interpolymers of 10–90 mole percent of ethylene, 10–90 mole percent of at least one alpha monoolefin containing 3–16 and preferably 3–10 carbon atoms, and 0.1–10 mole percent of at least one polyene. The preferred monolefins are ethylene and propylene, and the preformed polyenes are nonconjugated dienes which may be open chain or cyclic in nature. The open chain polyenes may contain 4–20, and preferably 5–10 carbon atoms of which 1,4-hexadiene is usually preferred. Other suitable open chain polyenes are disclosed in United States Pat. No. 2,933,480. The polyene is present in the polymer in an amount imparting sulfur vulcanizability, such as about 0.1–10 mole percent. The preparation and properties of the foregoing rubbers are well known and are described in a large number of issued United States patents and other publications.

Some of the better EPDM elastomers are products resulting from interpolymerizing a monomeric mixture containing ethylene, at least one other straight chain alpha monoolefin containing 3–16 and preferably 3–10 carbon atoms, which most preferably is propylene, and a polyunsaturaetd bridged-ring hydrocarbon having at least one carbon-to-carbon double bond in a bridged ring.

The polymerization is conducted in hexane or other organic polymerization solvent and in the presence of a catalyst prepared from vanadium oxytrichloride and methyl or ethyl aluminum sesquichloride or other suitable Ziegler catalyst. The preparation of the above types of EPDM elastomer and EPDM elastomers prepared from open chain polyenes is disclosed in United States patents such as 2,933,480, 2,975,159, 3,000,866, 3,093,620, 3,093,621, 3,211,709 and 3,113,115, the teachings of which are incorporated herein by reference.

Very useful EPDM elastomers are prepared from a monomeric mixture containing ethylene, propylene and polyunsaturated bridged-ring hydrocarbons or other polyenes in proportions to produce a polymer having good elastomeric properties and an unsaturation level of at least 2 carbon-to-carbon double bonds per thousand carbon atoms in the polymer. For example, the elastomer may contain chemically bound therein molar ratios of ethylene to propylene varying between about 80:20 and 20:80, and between 70:30 and 55:45 for better results, and 0.1–10 mole percent of the bridged-ring hydrocarbon. The bridged-ring hydrocarbon preferably is chemically bound therein in an amount to provide an unsaturation level of 2–25, and preferably about 3–16 carbon-to-carbon double bonds per thousand carbon atoms in the polymer.

Examples of the bridged-ring hydrocarbons include the polyunsaturated derivatives of bicyclo - (2,2,1)heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo-(2,2,2)-octane as represented by bicyclo(2,2,2)octa-2,5-diene, polyunsaturated derivatives of bicyclo(3,2,1)-octane, polyunsaturated derivatives of bicyclo - (3,3,1) - nonane, and polyunsaturated derivatives of bicyclo-(3,2,2)-nonane. At least one double bond is present in a bridged ring of the above compounds, and at least one other double bond is present in a bridged ring or in a side chain. Specific examples of bridged ring compounds include 5-methylene-2 - norbornene, 5 - ethylidene - 2 - norbornene, 5-isopropylidene-2-norbornene, dicyclopentadiene, the methyl butenyl norbornenes such as 5-(2-methyl-2-butenyl)-2-norbornene, or 5-(3-methyl-2-butenyl) norbornene and 5-(3,5-dimethyl-4-hexenyl)-2-norbornene. The elastomers prepared from ethylene, at least one monoolefin containing 3–16 carbon atoms, and the 5-alkylidene-2-norbornene, wherein the alkylidene group contains 1–2 and preferably 1–8 carbon atoms, produced much improved rubber modified plastics which have exceptional properties. The elastomer prepared from 5-ethylidene-2-norbornene is much preferred as it has outstanding properties and produces many unusual and unexpected results when used as the elastomer in high impact plastics. As a result, this elastomer is in a class by itself.

A wide variety of free radical polymerization initiators may be employed, including those used in the prior art processes for preparing high impact polystyrene and styrene-acrylonitrile plastics. In some instances, the hydroperoxide groups formed by oxidation of the rubbery component may act as the free radical initiator. Examples of free radical polymerization initiators include the organic peroxides such as benzoyl peroxide, lauroyl peroxide, propionyl peroxide, 2,4-dichlorobenzoyl peroxide, acetyl peroxide, tertiary butyl hydroperoxide, tertiary butyl perbenzoate, tertiary butyl peroxyisobutyrate, and dicumylperoxide. Mixtures of one or more peroxides may be employed. Additionally, mixtures of one or more peroxides with azo-bisdiisobutyronitrile give better results in some instances, and especially where a less graft polymerization active initiator is effective. The initiator mixture may contain 25–75% and preferably about 50% by weight of the azo-bisdiisobutyronitrile, and 75–25%, and preferably about 50% by weight, of one or more of the above organic peroxides.

The amount of the alkenyl aromatic monomer and/or the acrylic monomer that is grafted on the elastomer during the polymerization step is sufficient to make it compatible with the resin that is formed simultaneously. For example, the resin-forming monomer or monomers may be grafted on the elastomer in an amount to provide a ratio by weight of the grafted monomeric material to the elastomer between 1:4 and 4:1, and preferably between 1:2 and 2:1. The best results are usually obtained when about 30–120 parts by weight of the resin-forming monomer or monomers are grafted on each 100 parts by weight of the rubbery polymer.

The reaction mixture to be polymerized should contain about 1–20 parts by weight, and preferably 5–15 parts by weight, of the EPDM elastomer for each 100 parts by weight of the alkenyl aromatic monomer and/or the acrylic monomer. The monomeric material may be one or more alkenyl aromatic monomers or acrylic monomers, or a mixture thereof in the ratios previously mentioned. The reaction mixture also should contain about 0.05–2.5 parts by weight, and preferably 0.2–0.5 part by weight of the free radical catalyst or initiator for each 100 parts by weight of resin-forming monomer or monomers.

The temperature of the polymerization may vary over wide ranges. For instance, reaction temperatures of approximately 40–150° C., and preferably about 60–80° C. are usually satisfactory. The polymerization is continued in each instance for a sufficient period of time to assure a desired percent conversion of the monomer or monomers. This will vary somewhat with the specific catalyst, rubbery polymer, monomers, and reaction temperature that are employed. The overall reaction is usually continued in any event until at least 90% by weight of the monomeric material initially present has been converted to polymer, and for best results 95–100% to 98–100% by weight.

Prior art antioxidants and other compounding ingredients and aids may be added at any convenient point in the process. Examples of suitable antioxidants include phosphited polyalkyl polyphenols and tri (mixed monononyl-dinonyl) phenyl phosphite. When desired, coloring agents may be added to produce colored resins. The coloring pigments of the prior art are suitable for this purpose.

The products produced in accordance with the present invention have higher impact resistance, tensile strength and hardness than similar high impact plastics prepared in the absence of the preformed dispersing aid. The plastics also have markedly higher oxidation resistance and better weathering properties than similar plastics prepared from highly unsaturated diene rubbers. Much less antioxidant may be used and this reduces the cost of manufacture and aids in keeping the nonpolymer content at a minimum.

The foregoing detailed description and the following specific examples are for purposes of illustration only, and are not intended as being limiting to the spirit or scope of the appended claims.

EXAMPLE I

This example illustrates that EPDM elastomers are insoluble in a mixture of styrene and acrylonitrile monomers.

A series of mixtures were prepared which contained 2.5%, 5%, 10%, 15% and 20% by weight of acrylonitrile in styrene. To each of the mixtures was added 5% by weight of a terpolymer prepared from ethylene, propylene and 5-ethylidene-2-norbornene. The terpolymer contained chemically bound therein approximately equal weights of ethylene and propylene, and sufficient 5-ethylidene-2-norbornene to provide an unsaturation level of 3.7 carbon-to-carbon double bonds per 1000 carbon atoms.

The above mixtures were agitated for two days and observed. The only sample that showed any sign of dissolving the elastomer was the mixture containing 2.5% by weight of acrylonitrile. However, even in this instance a grainy, viscous slurry was obtained as distinguished from a true solution. The presence of more than 20% by weight of acrylonitrile in the styrene, such as up to 60% by weight, also results in insolubility of the terpolymer.

The above tests were conducted with terpolymers containing similar amounts of chemically bound ethylene, propylene and methyl-2-butenyl-2-norbornene or 1,4-hexadiene as the third monomer. These terpolymers were also insoluble. When a diene rubber such as polybutadiene is substituted for the terpolymers in the styrene-acrylonitrile mixtures, then complete solubility is obtained.

The above data demonstrate that terpolymers of ethylene, propylene and polyenes are insoluble in the commercially important ratios of styrene to acrylonitrile. Attempts to polymerize the above prepared slurries of the terpolymer in the styrene-acrylonitrile monomer mixture in the presence of a free radical initiator produce a product which does not meet commercial specifications.

EXAMPLE II

This example illustrates the effectiveness of the dispersing agents of the invention in preparing dispersions of the EPDM elastomer in mixtures of styrene and acrylonitrile monomers.

A stock solution of an EPDM elastomer in styrene was prepared which contained on a weight basis 10 parts of the elastomer for each 75 parts of styrene monomer. The specific elastomer that was used contained approximately equal weights of chemically bound ethylene and propylene, and sufficient chemically bound 5-ethylidene-2-norbornene to provide an unsaturation level of 3.7 carbon-to-carbon double bonds per 1000 carbon atoms. The Mooney viscosity was 113 (ML-4).

The dispersing agent was a copolymer of styrene and acrylonitrile. It was prepared by polymerizing 3 parts by weight of styrene monomer and 1 part by weight of acrylonitrile monomer at a temperature of 70° C. and in the presence of 0.3 part of benzoyl peroxide until the monomers were converted to polymer. The resulting styrene-acrylonitrile copolymer was added to three portions of the stock styrene solution of the EPDM elastomer in amounts to provide 2, 5 and 10 parts by weight for each 75 parts by weight of styrene. A control was prepared which contained no styrene-acrylonitrile copolymer. Thereafter, 25 parts by weight of acrylonitrile monomer for each 75 parts by weight of styrene monomer was added slowly to each of the four portions with high shear agitation. The resulting mixtures were observed to determine the degree of dispersion of the EPDM elastomer.

In the controlled portion where no styrene-acrylonitrile copolymer was added, the EPDM elastomer separated into a tight gel. In the portions where 2, 5 and 10 parts by weight of the styrene-acrylonitrile copolymer was added, there was marked improvement in the dispersion of the elastomer. The best dispersion contained 10 parts by weight of the styrene-acrylonitrile copolymer and it was very fine and stable. The remaining two portions contained somewhat coarser dispersions, but they were satisfactory and especially when subjected to high shear agitation during polymerization.

EXAMPLE III

The general procedure of Example II was followed with the exception of substituting a product obtained by interpolymerizing in the presence of benzoyl peroxide the dispersion of Example II which contained about 5 parts by weight of the styrene-acrylonitrile copolymer as the dispersing agent. The EPDM elastomer used in preparing the dispersing agent is described in Example II, and it was grafted with styrene and acrylonitrile monomers in a weight ratio of styrene to acrylonitrile of 3:1, at a temperature of 70° C. and in the presence of 0.3 part of benzoyl peroxide as an initiator.

The above mentioned dispersing aid which was prepared from the Example II dispersion was added to three portions of the styrene solution of the EPDM elastomer in amounts to provide 2, 5 and 10 parts by weight for each 75 parts by weight of styrene. Acrylonitrile monomer was added to the four portions with agitation, as in Example II, and the portions were observed. A very fine and smooth dispersion was obtained in the portion containing 10 parts by weight of the grafted EPDM elastomer. Somewhat coarser but satisfactory dispersions were obtained in the portions having 2 or 5 parts by weight of the grafted EPDM elastomer.

EXAMPLE IV

The procedure of Example II is repeated with the exception of substituting a cement dispersion of styrene-acrylonitrile copolymer and an EPDM elastomer grafted with styrene and acrylonitrile monomers as the dispersing agent.

The cement dispersion is prepared by dissolving 10 parts by weight of the EPDM elastomer described in Example II in 75 parts by weight of styrene, 5 parts preformed styrene-acrylonitrile interpolymer, and then slowly adding 25 parts by weight of acrylonitrile with vigorous agitation. The resulting mixture is polymerized in the present of 0.3 part of benzoyl peroxide as an initiator at a temperature of 70° C., until 22% by weight of the styrene and acrylonitrile monomers are converted to polymer. The reaction is stopped by lowering the temperature to 20–30° C., and the resulting cement is used as the dispersing agent.

The cement is added to three sample portions of the stock EPDM elastomer solution of Example II in amounts to provide 10, 20 and 30 parts by weight for each 75 parts by weight of styrene. The acrylonitrile monomer, in amounts to provide 25 parts by weight for each 75 parts by weight of styrene, is then added to the samples with high shear agitation as in Example II, and the degree of dispersion is observed.

The ungrafted EPDM elastomer is dipsersed in each of the solutions, but the dispersion is finer as the amount of cement is increased. Satisfactory dispersions are obtained in all three samples.

EXAMPLE V

This example illustrates the preparation of rubber modified plastics in accordance with the present invention using a copolymer of styrene and acrylonitrile as a dispersing aid. The EPDM elastomer was the terpolymer of ethylene, propylene and 5-ethylidene-2-norbornene that is described in Example II. The copolymer of styrene and acrylonitrile was the same as that used in Example II.

Styrene monomer in an amount of 150 grams, the EPDM elastomer in an amount of 20 grams and the styrene-acrylonitrile copolymer in an amount of 4 grams, were added to a Waring blender and agitated until a solution was obtained. Then, 50 grams of acrylonitrile monomer was added slowly with vigorous agitation. This procedure produced a very fine dispersion of the EPDM elastomer in the mixture of monomers.

The above mixture was transferred to a laboratory scale reactor and 0.6 gram of benzoyl peroxide was added as an initiator. The mixture was agitated vigorously and reacted at 70° C. for 0.67 hour to produce a viscous prepolymer cement.

The prepolymer cement was suspended in 440 grams of water which contained 0.66 gram of hydroxyethyl cellulose as a dispersing aid and 0.02 gram of sodium hydrosulfite as an oxygen scavenger. The cement dispersed readily when agitated with a marine impeller operating at 500 revolutions per minute to thereby produce small suspended globules of cement.

The reaction vessel was placed under a nitrogen pressure of 30 pounds per square inch and the polymerization was continued at 70° C. for 16 hours. The mixture was agitated at 500 r.p.m. during this 16-hour period. This resulted in substantially complete conversion of the monomers to polymer, i.e., to a mixture containing styrene-acrylonitrile copolymer and EPDM elastomer grafted with styrene and/or acrylonitrile. The product was in the form of small beads having a size of approximately 1–2 mm. The beads of polymer were collected on a sieve and dried at 105° C.

The rubber modified plastic thus prepared was tested following prior art procedures to determine the hardness, impact resistance and tensile strength. The Rockwell hardness was determined using the "R" scale by ASTM D–785–65, Procedure B; the Izod impact resistance was determined by ASTM D–256–56, Method A, and the tensile strength was determined by ASTM D–638–61T. The Rockwell hardness was 109 ("R" scale), the Izod impact resistance was 3.34 foot pounds per inch of notch, and the tensile strength was 8,260 pounds per square inch at yield.

EXAMPLE VI

This example illustrates the preparation of rubber modified plastics in accordance with the present invention using the dispersing aid which was prepared from the Example II dispersion in accordance with the procedure of Example III. The ungrafted EPDM elastomer used to modify the plastic is a terpolymer containing approximately equal weights of ethylene and propylene chemically bound therein, and sufficient 5-ethylidene-2-norbornene as a third monomer to provide an unsaturation level of 5.0 carbon-to-carbon double bonds per 1000 carbon atoms. The ungrafted EPDM elastomer has a Mooney viscosity of 120 (ML–4).

Styrene is added to a Waring blender in an amount of 150 grams, the ungrafted EPDM elastomer is added in an amount of 30 grams, and the grafted EPDM elastomer is added in an amount of 10 grams. The mixture is agitated until dissolved and then 50 grams of acrylonitrile is added slowly with vigorous agitation. The resulting mixture contains the ungrafted EPDM elastomer in the form of a very finely divided dispersion.

The above mixture is transferred to a laboratory reactor and 0.6 gram of benzoyl peroxide is added as an initiator. The mixture is reacted at a temperature of 70° C. until a viscous prepolymer cement is produced and then the reaction is terminated by lowering the temperature to 20–30° C.

The prepolymer cement is suspended in 380 grams of water containing 0.38 gram of hydroxyethyl cellulose as a dispersing aid, and 0.4 gram of sodium hydrosulfite as an oxygen scavenger following the procedure of Example V.

The reaction is allowed to proceed at 70° C. for 16 hours, at which time the monomers have substantially all reacted to form polymer.

The solid polymer beads are recovered by filtration, dried at 100° C., and tested in accordance with the procedures of Example V. The Rockwell hardness was 96 ("R" scale), the Izod impact resistance was 5.37 ft. lb./in. of notch, and the tensile strength was 7000 lb./sq. in.

EXAMPLE VII

This example illustrates the preparation of rubber modified plastics using a blend back procedure in which prepolymer cement containing styrene-acrylonitrile copolymer and grafted EPDM elastomer is used as a dispersing aid.

A laboratory reactor was charged with 900 grams of styrene, 144 grams of the ungrafted terpolymer described in Example VI and 96 grams of the grafted terpolymer described in Example II. The mixture was agitated until a solution was obtained, and then 300 grams of acrylonitrile monomer was added slowly with vigorous agitation to thereby produce a very fine dispersion of the ungrafted terpolymer in the monomers. Benzoyl peroxide was added in an amount of 1.2 grams, and the temperature was raised to 70° C. to initiate the polymerization. The reaction was carried to 22% by weight conversion of the monomers to produce a viscous prepolymer cement.

One-half of the prepolymer cement was removed from the reactor, and the reactor was charged with 450 grams of styrene containing 72 grams of the ungrafted EPDM elastomer dissolved therein. Then, 150 grams of acrylonitrile and 0.6 gram of benzoyl peroxide were added with vigorous agitation.

A stable, finely divided dispersion was produced which was polymerized until 22% by weight of the monomers present had been converted to polymer and a second batch of prepolymer cement was produced. One-half of the second batch of prepolymer cement was withdrawn from the reactor, and a fresh charge of reactants was added as described immediately above.

The above cycle was repeated for seven times and a stable dispersion of the EPDM elastomer in the monomers resulted in each instance. The prepolymer cement which was removed from the reactor during each cycle was suspended in water and polymerized to a solid rubber modified plastic product following the procedure of Example V. The products were tested following the procedure of Example V and were found to have good physical properties.

EXAMPLE VIII

This example illustrates the relatively poor products produced by prior art polymerization conducted in the absence of the dispersing agent of the invention. The EPDM elastomer used in modifying the polystyrene prepared by this example was a terpolymer of ethylene, propylene, and 5-ethylidene-2-norbornene having a Mooney viscosity of 140 (ML–8). The polymer contained approximately equal weights of ethylene and propylene chemically bound therein, and sufficient 5-ethylidene-2-norbornene to provide an unsaturation level of 12.9 carbon-to-carbon double bonds per 1000 carbon atoms.

Styrene monomer in an amount of 1500 grams, the EPDM elastomer in an amount of 150 grams, and benzoyl peroxide in an amount of 6 grams were charged to a ½ gallon glass reactor fitted with a marine impeller for agitation. The mixture was heated to 80° C. and reacted for 2.25 hours to provide a prepolymer cement containing 39.5% by weight solids. The marine impeller was operated at 2000 r.p.m. throughout the run.

A ½ gallon glass reactor fitted with a marine impeller was charged with 800 grams of water, 0.8 gram of hydroxyethyl cellulose as a suspending agent, 0.4 gram of Daxad 15 (polymerized sodium salts of alkyl naphthalenesulfonic acid), and 0.04 gram of sodium hydrosulfite as an oxygen scavenger. The marine impeller was operated at 750 r.p.m., and 400 grams of the prepolymer cement was added slowly to thereby suspend it in the water in the form of small droplets. The reaction mixture was heated to 83° C. and reacted for 16 hours with agitation by means of the marine impeller operating at 750 r.p.m.

The product was in the form of solid beads having diameters of approximately 1 mm. The beads were collected on a sieve, dried for 16 hours in vacuum at 90° C., and pelletized before testing in accordance with the procedures of Example V. The particle size of the dispersed EPDM elastomer was also determined by light microscopy.

The Izod impact resistance was 0.63 ft. lb./in. of notch, and the Rockwell hardness ("R" scale) was 104. The dispersed particle size of the EPDM elastomer varied between 1 and 76 microns.

A second run was made which was identical to the above with the exception of employing a terpolymer of ethylene, propylene and 5-ethylidene-2-norbornene having a Mooney viscosity of 94 (ML–8) and an unsaturation level of 9.8 carbon-to-carbon double bonds per 1000 carbon atoms. The product was tested, and the Izod impact resistance was 0.42 ft. lb./in. of notch and the Rockwell hardness ("R" scale) was 108.

EXAMPLE IX

This example illustrates the use of the blend back process of the present invention for the preparation of high impact polystyrene. The data thus obtained are compared with the data of Example VIII.

The ½ gallon glass reactor employed in Example VIII was charged with one-half of the polymerization recipe, i.e., 750 grams of styrene monomer, 75 grams of the terpolymer, 3 grams of benzoyl peroxide, and 828 grams of the prepolymer cement prepared in Example VIII as a dispersing aid. The mixture was reacted at a temperature of 80° C. for 1.0 hour while agitated with the marine impeller operating at 2000 r.p.m. The resulting prepolymer cement had a solids content of 42.2%. The terpolymer was uniformly dispersed in the mixture in very finely divided form throughout the prepolymerization whereas in VIII there was phase separation.

A portion of the prepolymer cement prepared above was suspended in water and the polymerization was continued for 16 hours at 80° C. following the procedure of Example VIII. The resulting product was in the form of beads of polymer, and it was collected, dried, pelletized and tested in accordance with Example VIII.

The product of this example had an Izod impact resistance of 1.82 ft. lb./in. of notch, a Rockwell hardness ("R" scale) of 103, and a dispersed elastomer particle size of 1–12 microns. Thus, the impact resistance was improved markedly over the product of Example VIII without sacrificing hardness, and the dispersed elastomer particle size was reduced greatly.

In a second run using the same terpolymer that was used in the second run of Example VIII, the product had an Izod impact resistance of 0.92 ft. lb./in. of notch and a Rockwell hardness ("R" scale) of 111. This product also had much better physical properties than the product produced in accordance with the second run of Example VIII.

EXAMPLE X

This example illustrates the use of the continuous process of the present invention for the preparation of high impact polystyrene.

The polymerization reaction was carried out continuously in a ½ gallon glass reactor which was fitted with a marine-type impeller and closed off from the atmosphere. The reactor was also fitted with an input line through which a solution of the elastomer in styrene monomer and benzoyl peroxide were fed, and an output line through which the prepolymer cement was withdrawn. The reactor was pressurized to 25 p.s.i. with nitrogen, and the impeller was operated at 2000 r.p.m.

The elastomer was a terpolymer of ethylene, propylene and 5-ethylidene-2-norbornene which had a Mooney viscosity of 140 (ML–8), and an unsaturation level of 12.9 carbon-to-carbon double bonds per 1000 carbon atoms. The styrene monomer solution was stored in a vessel pressurized with nitrogen to 25 p.s.i.g., at a temperature below the activation tempearture for the catalyst, and it contained by weight 100 parts of styrene, 10 parts of the elastomer, and 0.4 part of benzoyl peroxide. The solution was fed to the reactor at the rate of 7.46 grams per minute. The average residence time in the reactor was 148 minutes and the reaction temperature was 80° C. The average conversion of monomers in the effluent prepolymer cement was 29.3%.

A vessel fitted with a marine impeller was charged with 800 grams of water which contained 0.4 gram of a surfactant which was polymerized sodium salts of alkyl aryl sulfonic acid (Daxad 15), 0.8 gram of hydroxyethyl cellulose and 0.04 gram of sodium hydrosulfite. The marine impeller was operated at a speed of 500 r.p.m., and 400 grams of the prepolymer cement was added slowly to the water in the vessel. The resulting suspended globules of prepolymer cement were polymerized at 100° C. until essentially all of the styrene was converted to polymer.

The resulting beads of polymer were collected, dried and tested as in Example V. The Izod impact resistance was 2.39 ft. lb./in. of notch, the Rockwell hardness ("R" scale) was 98, and the tensile strength was 6,330 p.s.i.

EXAMPLE XI

The procedure of Example X is followed with the exception of also continuously feeding a stream of acrylonitrile monomer to the reaction vessel in a quantity sufficient to provide 1 part by weight of acrylonitrile monomer for each 3 parts by weight of styrene monomer. The resulting product is a high impact styrene-acrylonitrile resin.

No phase separation occurred during the continuous polymerization, and the physical properties of the resulting product are comparable with those of Examples V through VII.

What is claimed is:
1. A method of preparing a dispersion of a rubbery interpolymer of ethylene, at least one alpha monoolefin containing 3–16 carbon atoms and at least one polyene is a liquid mixture containing an alkenyl aromatic monomer and an acrylic monomer comprising dissolving the rubbery interpolymer in the alkenyl aromatic monomer and mixing the solution of the rubbery interpolymer with the acrylic monomer in the presence of a dispersing agent selected from the group consisting of (a) interpolymers of the alkenyl aromatic monomer and the acrylic monomer, (b) graft interpolymers of the rubbery interpolymer, the alkenyl aromatic monomer and the acrylic monomer, and (c) mixture thereof, the resulting mixture containing at least 1 part by weight of the rubbery polymer, at least .03 part by weight of the dispersing agent and at least 5 parts by weight of the acrylic monomer for each 100 parts by weight of the alkenyl aromatic monomer and the acrylic monomer, the acrylic monomer having the general formula

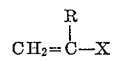

wherein R is selected from the group consisting of hydrogen and alkyl groups having 1–5 carbon atoms, and X is selected from the group consisting of

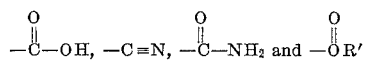

wherein R' is an alkyl group containing 1–9 carbon atoms, and the alkenyl aromatic monomer being selected from the group consisting of alkenyl aromatic hydrocarbons having 8–20 carbon atoms and the halogenated derivatives thereof.

2. The method of claim 1 wherein the dispersing agent is prepared by interpolymerization in the presence of a free radical initiator of a mixture of the said rubbery interpolpmer, alkenyl aromatic monomer and acrylic monomer.

3. The method of claim 1 wherein the rubbery interpolymer is an interpolymer of ethlyene, propylene and 5-alkylidene-2-norbornene, the alkylidene group containing 1–20 carbon atoms.

4. The method of claim 3 wherein the 5-alkylidene-2-norbornene is 5-ethylidene-2-norbornene.

5. The method of claim 1 wherein the alkenyl aromatic monomer is styrene monomer, the acrylic monomer is acrylonitrile monomer, and the ratio by weight of the styrene monomer to the acrylonitrile monomer is between 2:1 and 4:1.

6. The method of claim 5 wherein the resulting mixture contains about .1-10 parts by weight of the dispersing agent and about 5-15 parts by weight of the rubbery interpolymer for each 100 parts by weight of the styrene monomer and arcylonitrile monomer, the dispersing agent is the product of the interploymerization in the presence of a free radical catalyst of a mixture of the said rubbery interpolymer, styrene monomer and acrylonitrile monomer in about the proportions initially present in the said mixture, the ratio by weight of styrene monomer to acrylonitrile monomer is about 3:1 initially, and the rubber interpolymer is a terpolymer of ethylene, propylene and 5-ethylidene-2-norbornene.

7. A process for preparing rubber modified plastics comprising dissolving a rubbery interploymer of ethylene, at least one alpha monoolefin containing 3-16 carbon atoms and at least one polyene in an alkenyl aromatic monomer selected from the group consisting of alkenyl aromatic hydrocarbons having 8-20 carbon atoms and the halogenated derivatives thereof, mixing the solution of the rubbery interpolymer with a dispersing agent selected from the group consisting of (a) graft interpolymers of the said rubbery interpolymer and alkenyl aromatic monomer, (b) graft interpolymers of the said rubbery interployner, the said alkenyl aromatic monomer and an acrylic monomer, and (c) mixtures thereof, the acrylic monomer having the general formula

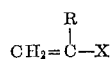

wherein R is selected from the group consisting of hydrogen and alkyl groups having 1-5 carbon atoms, and X is selected from the group consisting of

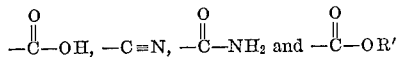

wherein R's is an alkyl group containing 1-9 carbon atoms, the resulting mixture containing at least 1 part by weight of the rubbery interpolymer and at least 1 part by weight of the dispersing agent for each 100 parts by weight of monomeric material present therein, and interploymerizing the resulting mixture in the presence of a free radical initiator until 90-100 percent by weight of the alkenyl aromatic monomer has reacted.

8. The process of claim 7 wherein acrylic monomer is mixed with the solution of the rubbery interpolymer in the presence of the dispersing agent, and the mixture of the alkenyl aromatic monomer, acrylic monomer and rubbery interpolymer is interpolymerized in the presence of the dispersing agent and the free radical initiator.

9. A process for preparing rubber modified plastics comprising dissolving a rubbery interpolymer of ethylene, at least one alpha monoolefin containing 3-16 carbon atoms and at least one polyene in an alkenyl aromatic monomer selected from the group consisting of alkenyl aromatic hydrocarbons having 8-20 carbon atoms and the halogenated derivatives thereof, mixing the solution of the rubbery interpolymer with a dispersing agent selected from the group consisting of (a) graft interpolymers of the said rubbery interpolymer and the alkenyl aromatic monomer (b) interpolymers of the said alkenyl aromatic monomer and an acrylic monomer, (c) graft interpolymers of the said rubbery interpolymer and the said alkenyl aromatic monomer and an acrylic monomer, and (d) mixtures thereof, the acrylic monomer having the general formula

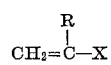

wherein R is selected from the group consisting of hyrogen and alkyl groups having 1-5 carbon atoms, and X is selected from the group consisting of

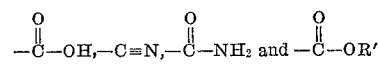

wherein R' is an alkyl group containing 1-9 carbon atoms, the resulting mixture containing 1-20 parts by weight of the rubbery interpolymer and at least .03 part by weight of the dispersing agent for each 100 parts by weight of the alkenyl aromatic monomer, and interpolymerizing the mixture in the presence of a free radical initiator until 90-100 percent by weight of the alkenyl aromatic monomer has reacted.

10. The process of claim 9 wherein the dispersing agent is prepared by the interpolymerization of a mixture of the said rubbery interpolymer and the alkenyl aromatic monomer in the presence of a free radical initiator.

11. The process of claim 9 wherein the rubbery interpolymer is an interpolymer of ethylene, propylene and 5-alkylidene-2-norbornene, the alkylidene group containing 1-20 atoms.

12. The process of claim 11 wherein the 5-alkylidene-2-norbornene is 5-ethylidene-2-norbornene and the alkenyl aromatic monomer is styrene monomer.

13. The process of claim 9 wherein the alkenyl aromatic monomer is styrene monomer, the mixture is interpolymerized with agitation until about 10-40 percent by weight of the styrene monomer has reacted to produce a cement containing polystyrene and a graft interpolymer of the said rubbery interpolymer and the styrene monomer, and the cement is further polymerized until about 90-100 percent of the styrene monomer has reacted to produce the rubber modified plastic.

14. The process of claim 9 wherein the alkenyl aromatic monomer is styrene monomer and the dispersing agent is a cement prepared in accordance with claim 13.

15. The process of claim 9 wherein the alkenyl aromatic monomer is styrene monomer and the dispersing agent is a rubber modified plastic prepared in accordance with claim 13.

16. The process of claim 13 wherein the cement is polymerized in bulk form until about 90-100 percent by weight of the styrene monomer has reacted.

17. The process of claim 13 wherein the cement is suspended in water in the form of subdivided particles, the water suspension of the cement particles is agitated, and the polymerization is continued until about 90-100 percent by weight of the styrene monomer has reacted.

18. The process of claim 9 wherein the rubber modified plastic is prepared by interpolymerizing the rubbery interpolymer and the alkenyl aromatic monomer contained in a portion of the said solution in a polymerization zone in the presence of a free radical initiator until about 10-40 percent by weight of the alkenyl aromatic monomer has reacted and a cement is produced which contains a homopolymer of the alkenyl aromatic monomer and a graft interpolymer of the said rubbery interpolymer and the alkenyl aromatic monomer, maintaining a body of the cement containing free radical initiator in the polymerization zone as the dispersing agent, passing additional successive portions of the said solution into the polymerization zone and admixing the additional portions with the body of the cement, interpolymerizing the rubbery interpolymer and the alkenyl aromatic monomer contained in the said additional portions of solution until 10-40 percent by weight of the alkenyl aromatic monomer has reacted to produce cement, and thereafter interpolymerizing at least a portion of the cement until 90-100 percent by weight of the alkenyl aromatic monomer has reacted to produce the rubber modified plastic.

19. The process of claim 18 wherein the alkenyl aromatic monomer is styrene monomer and the solution is passed continuously into the polymerization zone and admixed with the body of cement, cement containing free radical initiator and 90-60 percent by weight of the styrene monomer initially present is withdrawn continuously from the polymerization zone, and the withdrawn cement is further interpolymerized until 90-100 percent by weight of the styrene monomer has reacted to produce the rubber modified plastic.

20. The process of claim 19 wherein the rubbery interpolymer is a terpolymer of ethylene, propylene and 5-ethylidene-2-norbornene.

21. A process for preparing rubber modified plastics comprising preparing a dispersion of a rubbery interpolymer of ethylene, at least one monoolefin containing 3–16 carbon atoms and at least one polyene in a liquid mixture containing an alkenyl aromatic monomer and an acrylic monomer, the dispersion being prepared by dissolving the rubbery interpolymer in the alkenyl aromatic monomer and mixing the solution of the rubbery interpolymer with the acrylic monomer in the presence of a dispersing agent selected from the group consisting of (a) interpolymers of the alkenyl aromatic monomer and the acrylic monomer, (b) graft interpolymers of the rubbery interpolymer, the alkenyl aromatic monomer and the acrylic monomer, and (c) mixtures thereof, the acrylic monomer having the general formula

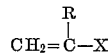

wherein R is selected from the group consisting of hydrogen and alkyl groups having 1–5 carbon atoms, and X is selected from the group consisting of

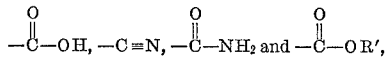

wherein R' is an alkyl group containing 1–9 carbon atoms, the alkenyl aromatic monomer being selected from the group consisting of alkenyl aromatic hydrocarbons having 8–20 carbon atoms and the halogenated derivatives thereof, the resulting mixture containing 1–20 parts by weight of the rubbery interpolymer and at least 0.3 part by weight of the dispersing agent for each 100 parts by weight of the alkenyl aromatic monomer and the acrylic monomer, and interpolymerizing the mixture in the presence of a free radical initiator until 90–100 percent by weight of the alkenyl aromatic monomer and acrylic monomer have reacted.

22. The process of claim 21 wherein the dispersing agent is prepared by the interpolymerization of a mixture of the said rubbery interpolymer, alkenyl adomatic monomer and acrylic monomer in the presence of a free radical initiator.

23. The process of claim 21 wherein the rubbery interpolymer is an interpolymer of ethylene, propylene and 5-alkylidene-2-norbornene, the alkylidene group containing 1–8 carbon atoms.

24. The process of claim 23 wherein the 5-alkylidene-2-norbornene is 5-ethylidene-2-norbornene, the alkenyl aromatic monomer is styrene monomer, and the acrylic monomer is acrylonitrile monomer.

25. The process of claim 21 wherein the alkenyl aromatic monomer is styrene monomer, the acrylic monomer is acrylonitrile monomer, the mixture is interpolymerized with agitation until about 10–40 percent by weight of the styrene monomer and acrylonitrile monomer have reacted to produce (a) an interpolymer of styrene and acrylonitrile, and (b) a graft interpolymer of the said rubbery interpolymer, styrene monomer, and acrylonitrile monomer, and the cement is further polymerized until about 90–100 percent of the styrene monomer and acrylonitrile monomer have reacted to produce the rubber modified plastic.

26. The process of claim 21 wherein the alkenyl aromatic monomer is styrene monomer, the acrylic monomer is acrylonitrile, and the dispersing agent is a rubber modified plastic prepared in accordance with claim 25.

27. The process of claim 25 wherein the ratio by weight of styrene monomer to acrylonitrile monomer is about 3:1, and the cement is polymerized in bulk form until about 90–100 percent by weight of the styrene monomer and acrylonitrile monomer have reacted.

28. The process of claim 25 wherein the ratio by weight of styrene monomer to acrylonitrile monomer is about 3:1, the cement is suspended in water in the form of subdivided particles, the water suspension of the cement particles is agitated, and the polymerization is continued until about 90–100 percent by weight of the styrene monomer and acrylonitrile monomer have reacted.

29. The process of claim 21 wherein the rubber modified plastic is prepared by interpolymerizing the rubbery interpolymer, the alkenyl aromatic monomer and the acrylic monomer contained in a portion of the said solution in a polymerization zone in the presence of a free radical catalyst until about 10–40 percent by weight of the alkenyl aromatic monomer and acrylic monomer have reacted and a cement is produced which contains (a) an interpolymer of the alkenyl aromatic monomer and the acrylic monomer, and (b) a graft interpolymer of the said rubbery interpolymer, the alkenyl aromatic monomer and the acrylic monomer, maintaining a body of the cement containing free radical initiator in the polymerization zone as the dispersing agent, passing additional successive portions of the said solution and acrylonitrile into the polymerization zone and admixing the additional portions with the body of the cement, interpolymerizing the rubbery interpolymer, the alkenyl aromatic monomer and the acrylic monomer contained in the said additional portions of solution until 10–40 percent by weight of the alkenyl aromatic monomer and acrylic monomer have reacted to produce cement, and thereafter interpolymerizing at least a portion of the cement until 90–100 percent by weight of the alkenyl aromatic monomer and acrylic monomer have reacted to produce the rubber modified plastic.

30. The process of claim 29 wherein the alkenyl aromatic monomer is styrene monomer, the acrylic monomer is acrylonitrile, the solution and acrylonitrile are passed continuously into the polymerization zone and admixed with the body of cement, cement containing free radical initiator and 90–60 percent by weight of the styrene monomer and acrylonitrile monomer initially present is withdrawn continuously from the polymerization zone, and the withdrawn cement is further interpolymerized until 90–100 percent by weight of the styrene monomer and acrylonitrile monomer have reacted to produce the rubber modified plastic.

31. The process of claim 30 wherein the rubbery interpolymer is a terpolymer of ethylene, propylene and 5-ethylidene-2-norbornene.

32. A rubbery interpolymer prepared by the method of claim 7.

References Cited

UNITED STATES PATENTS

| | | | |
|---|---|---|---|
| 3,151,173 | 9/1964 | Nyce | 260—666 |
| 3,166,524 | 1/1965 | Schmidle et al. | 260—880 |
| 3,317,635 | 5/1967 | Osmond | 260—880 |
| 3,330,786 | 7/1967 | Finestone et al. | 260—880 |

FOREIGN PATENTS 1,009,719  11/1965  Great Britain.

MURRAY TILLMAN, Primary Examiner

M. J. TULLY, Assistant Examiner

U.S. Cl. X.R.

260—876, 897